United States Patent [19]

Brittan

[11] Patent Number: 5,233,552
[45] Date of Patent: Aug. 3, 1993

[54] GRADE AVERAGING CALCULATOR

[76] Inventor: John L. Brittan, 3242 Fox Run Trail, De Land, Fla. 32724

[21] Appl. No.: 798,498

[22] Filed: Nov. 26, 1991

[51] Int. Cl.$^5$ ............................................. G06F 7/38
[52] U.S. Cl. ................................ 364/734; 364/715.05
[58] Field of Search .............. 364/734, 715.05, 709.07, 364/709.01; 434/353, 362

[56] References Cited

U.S. PATENT DOCUMENTS 3,470,368 9/1969 Brittan .
3,783,257 1/1974 Friedman et al. .
4,048,484 9/1977 Brittan .
4,118,783 10/1978 Collins .
4,225,932 9/1980 Hirano et al. .
4,282,580 8/1981 McGuire et al. .
4,715,011 12/1987 Brittan .
5,101,368 3/1992 Kaplan ........................... 364/715.05

Primary Examiner—Tan V. Mai
Attorney, Agent, or Firm—Warner, Norcross & Judd

[57] ABSTRACT

The specification discloses a hand-held calculator of the type used by teachers in averaging grades. The calculator permits intermixed entry of letter grades and numeric grades in an averaging sequence. A weight table may be stored in the calculator for automatic nonlinear weighting of inputted grades in the averaging process. An excused absence key permits a data entry that will not affect the average of the other inputted grades. The calculator permits display in any one of a variety of modes, such as letter grade, percent, and total points.

14 Claims, 5 Drawing Sheets

GRADE AVERAGING CALCULATOR

BACKGROUND OF THE INVENTION

The present invention relates to electronic hand-held calculators and more specifically to electronic hand-held calculators for processing student grades.

A variety of electronic calculators capable of processing student grades have been developed. These calculators facilitate the processing of student grades that are in either numerical or letter format.

A series of unique and clever grade averaging calculators have been patented by the present inventor. One such calculator is disclosed in U.S. Pat. No. 4,048,484, issued Sep. 13, 1977, and entitled DIGITAL GRADE AVERAGER. This calculator operates in either standard calculator mode or grade averaging mode. The grade averaging mode processes only letter grades.

A second such calculator is disclosed in U.S. Pat. No. 4,715,011, issued Dec. 22, 1987, entitled GRADE AVERAGING CALCULATOR. This calculator operates in three different modes: numerical grade mode, letter grade mode, and timer mode. The user selects the desired mode by depressing the appropriate key. Although this invention is a notable advance in grade averaging calculators, it requires letter and numerical scores to be processed in separate mutually exclusive modes.

SUMMARY OF THE INVENTION

In a first aspect of the invention, a calculator is provided capable of simultaneous mixed processing of both numerical and letter grades. More particularly, the calculator includes a matrix of keys for inputting both numerical and letter grades, means for converting the letter grades to numerical grades, and means for processing a series of numeric values to produce a numerical average. The calculator assigns a numeric value to a letter grade as the median of the range of scores assigned to that letter grade.

In a second aspect of the invention, the calculator accommodates "excused absences" or "no grades" that result from missed tests. More particularly, the calculator includes a means for incrementing the number of grades inputted while not adversely affecting the grade processing.

In a third aspect of the invention, the calculator is capable of converting and displaying the averaged grades among a series of grading systems. More particularly, the calculator includes a means for converting output to one of a series of grading systems, a means for displaying that output, and a means for allowing the user to select the desired grading system display.

These and other objects, advantages, and features of the present invention will be more fully understood and appreciated by reference to the detailed description of the preferred embodiment and the drawings.

DETAILED DESCRIPTION OF THE PREFERRED EMBODIMENT

Figure 6:
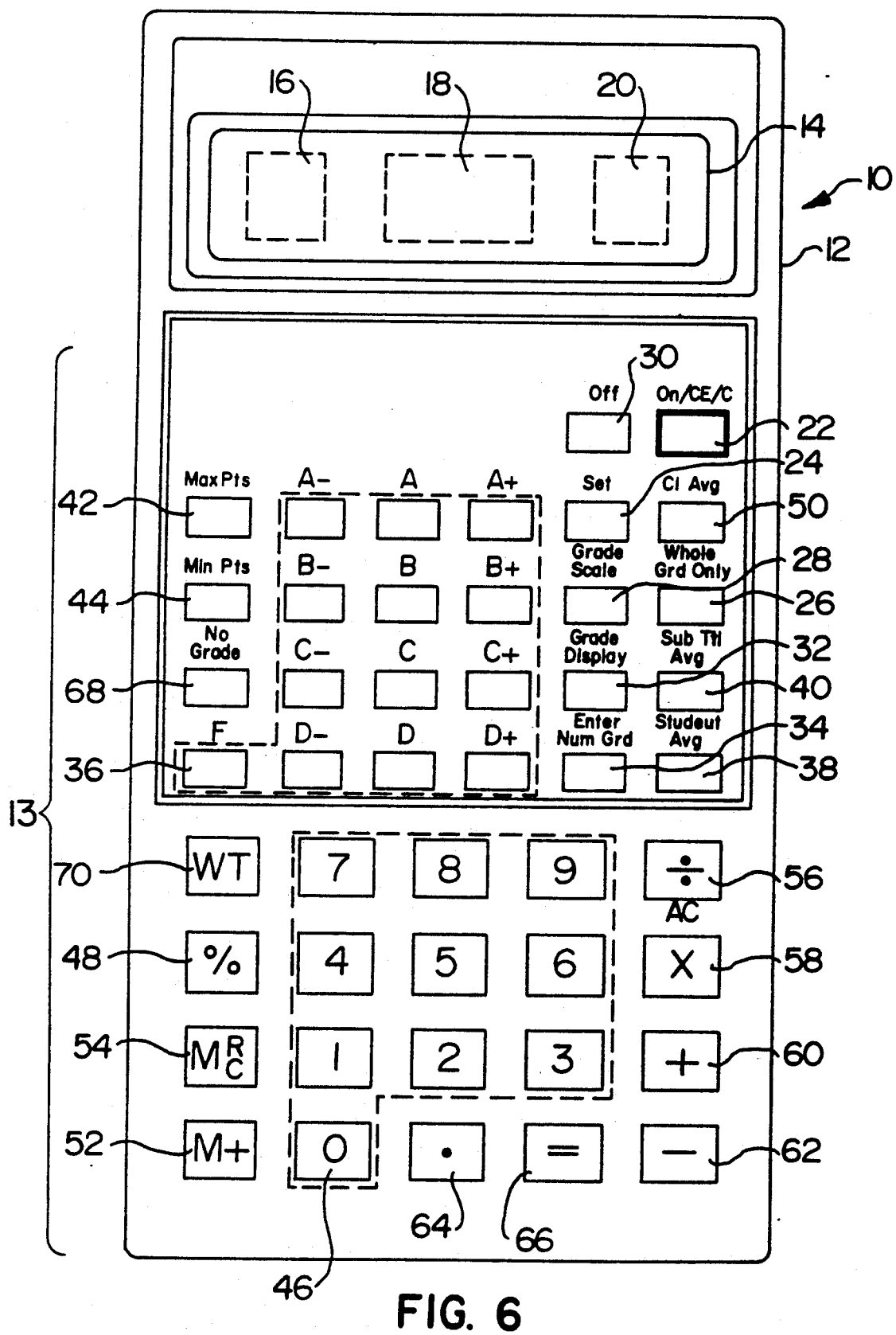
FIG. 6 front view of the calculator of the present invention.
Figure 7:
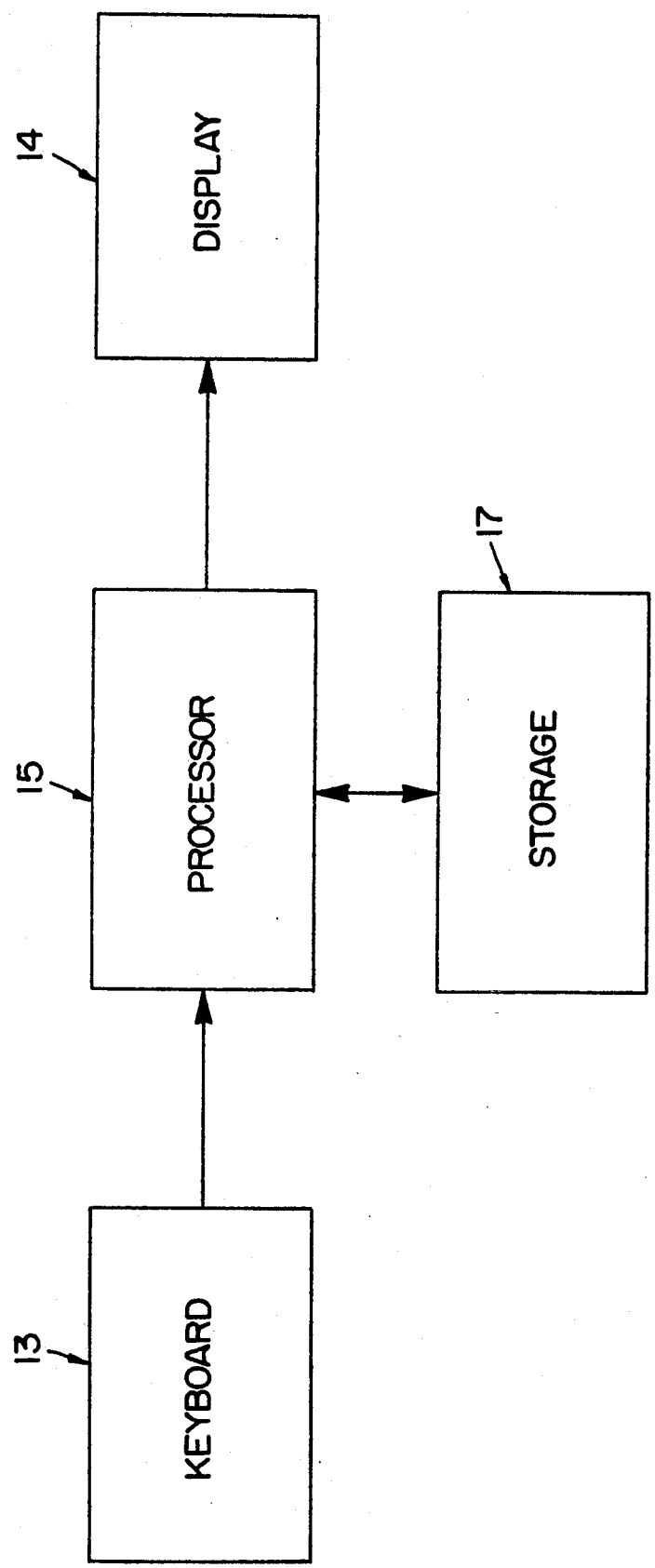
FIG. 7 is a block diagram of the calculator.

A calculator constructed in accordance with a preferred aspect of the invention is illustrated in FIG. 6 and generally designated 10. The calculator includes a body or housing 12 supporting a keypad 13 and a display 14. The display includes a number section 16, a numerical display section 18, a letter grade section 20, and a plurality of annunciator/indicators. The calculator 10 is illustrated in block form in FIG. 7 in a configuration that is conventional in the art. Specifically, the keypad 13 and the display 14 are both connected to a processor 15. A storage device 17 is also connected tot he processor 15. The processing and/or conversion functions described in this application are carried out by the processor 15; and storage functions are accommodated in storage device 17.

The keys supported within the body of the calculator are as follows:

| Key | Designating Numeral |
| --- | --- |
| ON/CE/C | 22 |
| SET | 24 |
| WHOLE GRADE ONLY | 26 |
| GRADE SCALE | 28 |
| OFF | 30 |
| GRADE DISPLAY | 32 |
| ENTER NUMBER GRADE | 34 |
| Individual Letter Grades | 36 |
| STUDENT AVERAGE | 38 |
| SUBTOTAL AVERAGE | 40 |
| MAXIMUM POINTS | 42 |
| MINIMUM POINTS | 44 |
| Individual Numbers | 46 |
| % | 48 |
| CLASS AVERAGE | 50 |
| M+ | 52 |
| M[R/C] | 54 |
| / | 56 |
| × | 58 |
| + | 60 |
| − | 62 |
| . | 64 |
| = | 66 |
| NO GRADE | 68 |
| WEIGHT | 70 |

The function of these keys is explained in conjunction with the flow charts of FIGS. 1-5.

Internally, the calculator includes a weight table that will store the weight of up to seven grades. The weight table is used to accommodate test scores that are of varying importance. For example, the user may program the calculator to make a final exam worth five times the weight of a weekly quiz. By appropriately adjusting the weight table, the user can cause the calculator to automatically process the grades accordingly.

To adjust the weight table the SET 24 and WEIGHT 70 keys must be depressed in succession. The first entry in the weight table will be displayed by the calculator. To traverse through the table the SET key 24 must be depressed. An individual entry can be adjusted by entering the desired weight before depressing the SET key 24. Each entry in the weight table has a default setting of one, thereby assigning each grade equal value unless modified by the user.

Also internally, the calculator includes a break point table. This table is used to store the break points between the individual letter grades. Each letter grade is assigned a numerical break point that represents the lowest numerical score that will achieve that particular letter grade. By reference to this table, the calculator can easily convert between letter and numerical grades.

The default setting of this table is based on a hundred point scale with one hundred being the maximum points and sixty being the minimum points (Table 1). The break points are derived by dividing the range defined by the high and low score into four subranges. These subranges define the whole grade break points. For example, the default whole grade break points are: 90 for an A, 80 for a B, 70 for a C, and 60 for a D. The subranges are further divided into three segments. These segments define the signed grade break points. For example, the signed grade break points for an A become: 96.66 for an A+, 93.33 for an A, and 90.00 for an A−.

TABLE 1

| Letter Grade | Break Point |
|---|---|
| A+ | 96.6 |
| A | 93.3 |
| A− | 90.0 |
| B+ | 86.6 |
| B | 83.3 |
| B− | 80.0 |
| C+ | 76.6 |
| C | 73.3 |
| C− | 70.0 |
| D+ | 66.6 |
| D | 63.3 |
| D− | 60.0 |

Although these break points are permanently embodied in read-only memory (ROM), the user can edit them to implement his own linear or non-linear scale using the nonvolatile area of random-access memory (RAM) by incorporating the SET 24 and GRADE SCALE 28 keys or the SET 24 and seven (7) 46. The SET 24 and GRADE SCALE 28 keys are used to edit only the whole grade break points. When depressed, the calculator will display a whole grade and its corresponding break point. If that break point requires adjustment, the desired break point is entered followed by depression of the SET key 24. This stores the new break point and displays the next default whole grade break point for editing. To store the next displayed default break point without adjusting the displayed break point, only the SET key 24 should be depressed.

The calculator automatically separates the whole grade ranges into three equal segments. These segments represent the signed grade ranges. For example, if the whole grade break point for an A is 92 and the whole grade break point for a B is 80, the signed grade break points become: 80 for a B−, 84 for a B, and 88 for a B+. The signed grade break points can be adjusted in a manner identical to one discussed immediately above, except that the SET 24 and seven (7) 46 keys should be depressed rather than the SET 24 and GRADE SCALE 28 keys. The user-implemented Break Points Table constitutes a second separate table from the default Break Points Table.

In addition, if the user alters either the maximum points (default 100) or minimum points (default 60), the calculator creates a third break point table to reflect that change. The new break points are computed in such a manner that the new grade ranges are proportionately equal to the user break point table, if implemented, or the default break point table. The following formula is used to convert the break points to the new break points of the third scale:

$$\text{New } B.P. = \text{New Min} + \frac{\text{Old } B.P. - \text{Old Min}}{\text{Old Max} - \text{Old Min}} \times [\text{New Max} - \text{New Min}]$$

I. MAIN ROUTINE

Figure 1:
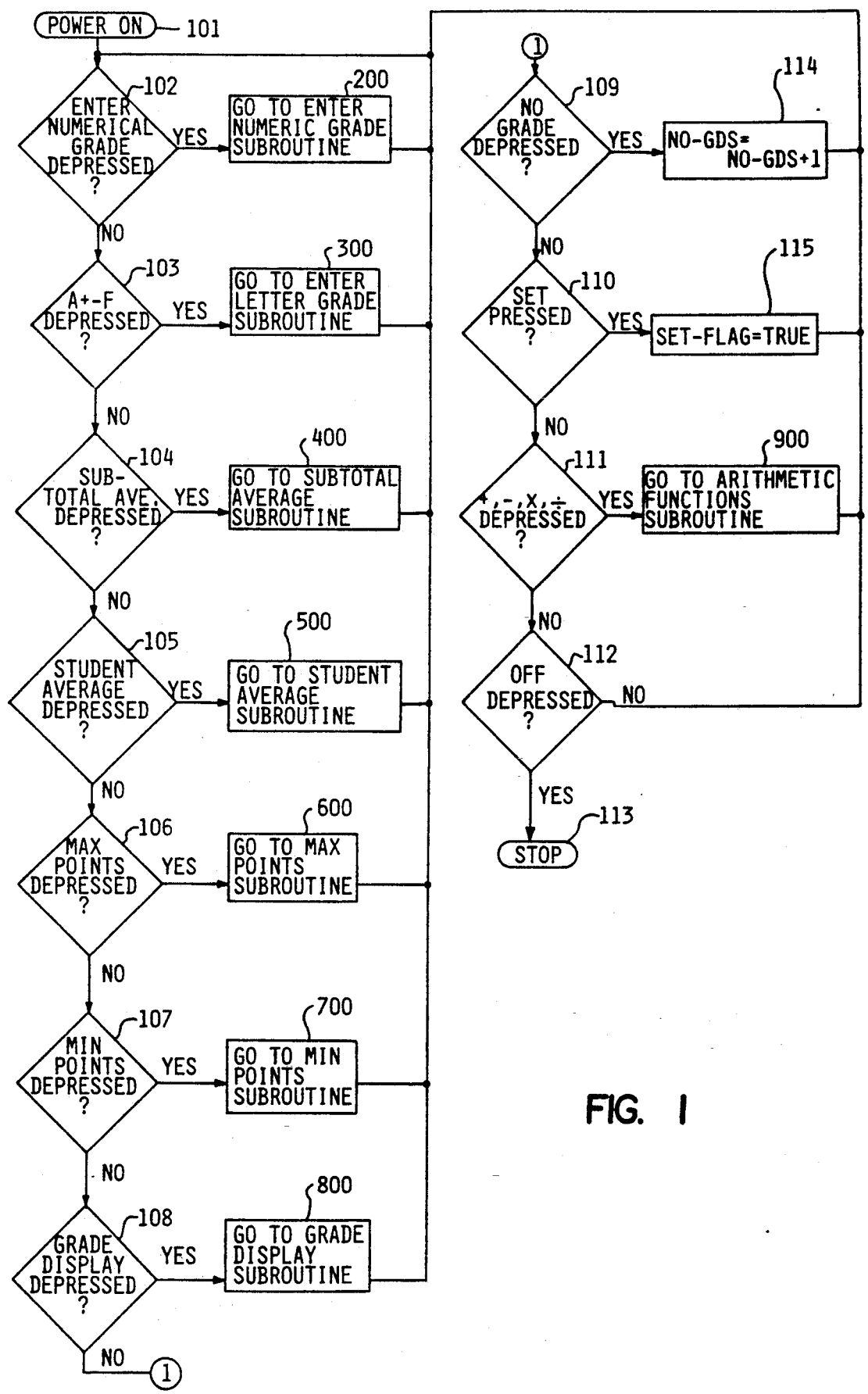
FIG. 1 is a flow chart illustrating the flow of the "main" routine of the calculator.
Figure 2:
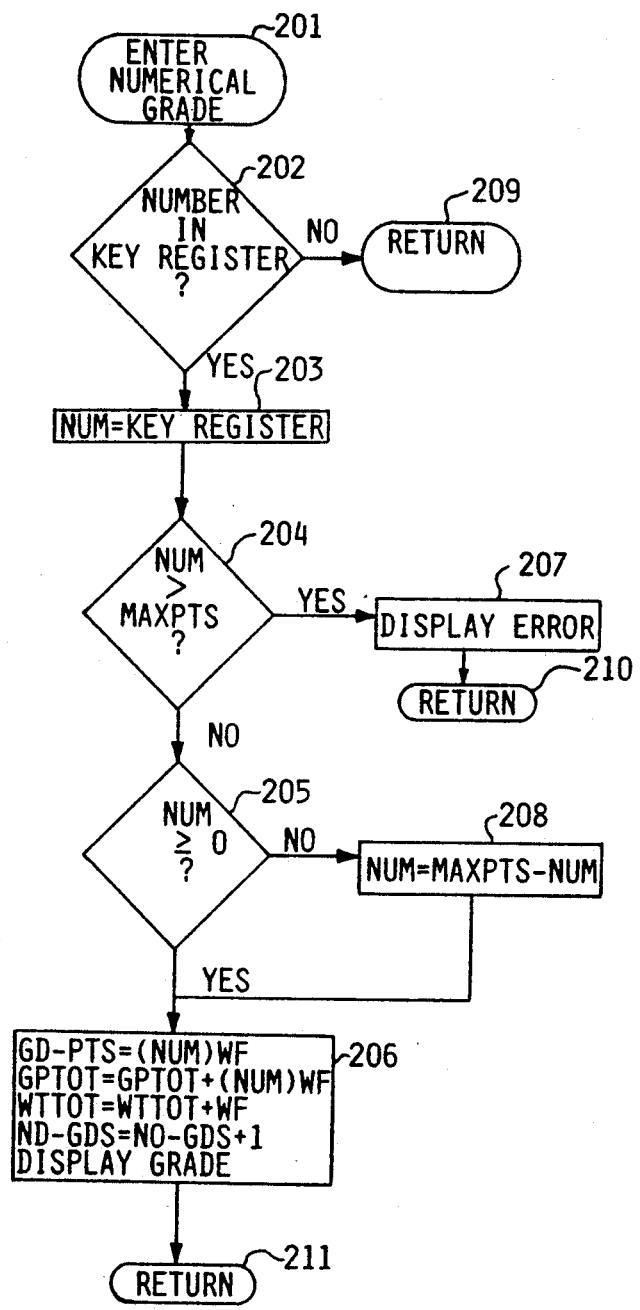
FIG. 2 is a flow chart illustrating the flow of the "numerical grades" subroutine.
Figure 3:
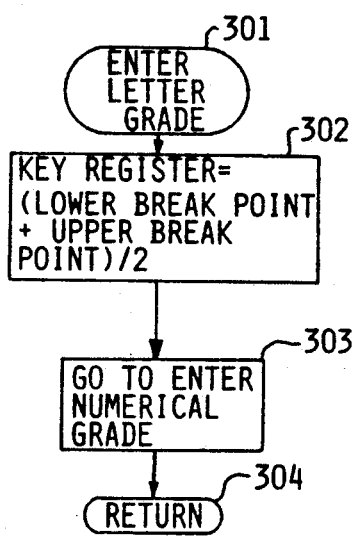
FIG. 3 is a flow chart illustrating the flow of the "letter grades" subroutine.
Figure 4:
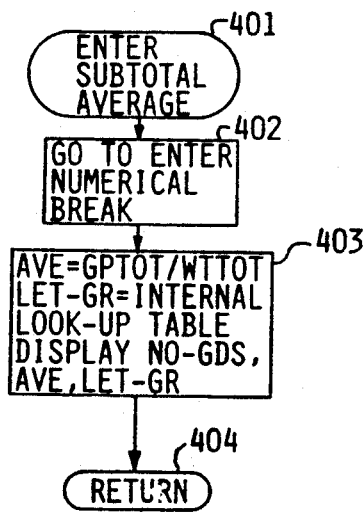
FIG. 4 is a flow chart illustrating the flow of the "subtotal average" subroutine.
Figure 5:
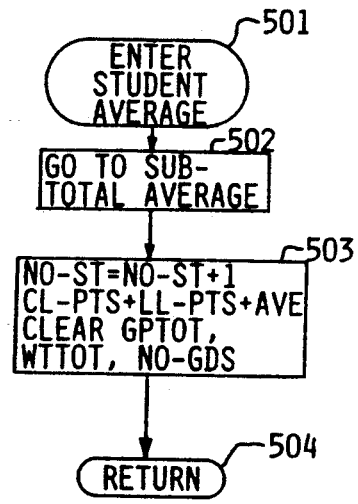
FIG. 5 is a flow chart illustrating the flow of the "student average" subroutine.

Program flow of the main routine 100 is illustrated in FIG. 1. The calculator is powered on by depressing the ON/CE/C key 22. Likewise, the calculator is powered off by depressing the OFF key 30. The weight table is reset to the default values, and the MAX and MIN values are reset to the (a) user defined values, if implemented, or (b) the default values (100, 60) each time the calculator is powered on. However, the user-defined break point table containing any modified break points is not reset to default, and the display format is not reset, unless the batteries are removed or the user performs a hard reset. A hard reset is performed by depressing the SET key 24 immediately followed by the times (X) 58 key. The main routine 100 will process letter grades, numerical grades, or standard calculator functions. In order to facilitate a precise description of the operation of the calculator, the following internal variables will be used:

| Variable | Description |
|---|---|
| MAXPTS | Maximum points achievable on a test |
| MINPTS | Minimum points acceptable on a test |
| WTTOT | Individual student weight factor total |
| GPTOT | Individual student grade point total |
| AVE | Individual student grade point average |
| GD-PTS | Current grades total grade points (after weighting) |
| WF | Weight factor (internal table) |
| NO-GDS | Individual student number of grades |
| NO-ST | Number of students processed |
| CL-PTS | Summation of the grade points earned by each student |
| NUM | Numerical representation of the current grade |
| LET-GR | Letter grade corresponding with to current grade |

II. NUMERICAL GRADE ENTRY

The main routine 100 transfers control to the numerical grade subroutine 200 when the ENTER NUMBER GRADE key 34 is depressed. This subroutine processes the number stored in the key register. If the key register does not contain a number the control is immediately returned to the main program 209.

The calculator permits the entry of numeric grades or points off/negative grading. To accommodate the negative grading aspect of this invention, the subroutine compares the number in the key register to zero 205. If the number entered was negative, then that number is subtracted from MAXPTS to produce the corresponding grade point score 208. If the number in the key register is not negative then that number is determined to be the grade point score. At this point, the calculator weights the grade point score by multiplying the grade point score by the appropriate weight factor 206. This product is the current grade's total grade points, GD-PTS. The appropriate weight factor is either retrieved from the weight table or manually entered.

An individual student's first seven grades will automatically be weighted according to the internal weight table. However, the weight factor of a single entry can be altered by inputting the desired weight factor and depressing the WEIGHT key. This feature also allows the user to weight grades beyond the seven entries in the weight table.

The numerical grade subroutine 201 processes the grades by storing a summation of the current student's weight factors in WTTOT and total grade points in GPTOT 206. The subroutine also stores the number of grades entered for the current student in NO-GDS 206. These summations are retained until the STUDENT AVERAGE key 38 or OFF key 30 is depressed. The subroutine displays the number of grades for the current student, the current grade's numerical score, and the current grade's letter score 206. Finally, control is returned to the calling routine 211.

III. LETTER GRADE ENTRY

The main routine 100 transfers control to the letter grade subroutine 301 when any of the letter grade keys are depressed. This subroutine utilizes the internal break point table to convert each letter grade to a numerical grade. The break point for the current letter grade and the break point for the next highest grade are retrieved from this table 302. If the current letter grade is the highest grade achievable, MAXPTS is deemed to be the upper break point. The subroutine computes the median of these two scores by summing them and then dividing this sum by two 302. This median score is treated as the numerical grade representation of the letter grade and is processed by the numerical grade subroutine 303.

IV. NO GRADE ENTRY

In a preferred embodiment of the present calculator a means for processing a missing grade is included. The NO GRADE key 68 allows a user to advance through the weight table in the event that a particular grade is missing. Upon depression of the NO GRADE key 68, the main routine 100 simply increments NO-GDS 114. Grade weights are retrieved from the internal weight table using NO-GDS as an index. Therefore, incrementing NO-GDS results in skipping an entry in the weight table.

V. OUTPUT

The calculator will display the student's subtotal average, the student's final average, and the class average.

VI. SUBTOTAL AVERAGE

The main routine 100 transfers control to the subtotal average subroutine 400 when the SUBTOTAL AVERAGE key 40 is depressed. This subroutine will display the current student's average numerical grade, average letter grade, and number of grades entered 403. This subroutine differs from the student average subroutine in that it does not signal the end of the current student's processing. Therefore, subsequently entered grades are processed as a continuation of the previously entered grades.

Depressing the SUBTOTAL AVERAGE key 40 also has the effect of depressing the ENTER NUMBER GRADE key 34. Immediately upon entering the subtotal average routine 401, control is temporarily passed to the numerical grade subroutine 200. If the key register is not empty its contents will be processed and included in the current output. In any case, control returns to the subtotal average subroutine 400.

After return from the numerical grade subroutine 200, the calculator displays the number of grades processed for the current student, NO-GDS; the average numerical grade, GPTOT divided by WTTOT; and the average letter grade, retrieved from the internal break point table based on the average numerical grade 403. Immediately following display, control is returned to the calling program 404.

VII. STUDENT AVERAGE

The student average subroutine 500 performs several functions. First, it indicates that the last grade for the current student has been entered. Secondly, it maintains the class average variables. And finally, it displays the current student's total number of grades, average numerical score, and average letter score.

The student average subroutine 500 is called by the main routine 100 when the STUDENT AVERAGE key 38 is depressed. The student average subroutine 500 transfers control to the subtotal average subroutine 400. The subtotal average subroutine 400 processes any grade in the key register, displays the proper output 403, and then returns control to the student average subroutine 404.

Subsequently, the student average subroutine 500 maintains the class average variables. NO-ST is incremented to reflect the number of students in the class 503. The student average, or GPTOT divided by WTTOT, is added to CL-PTS to facilitate later calculation of the class average 503. Lastly, the current student variables are cleared; GPTOT, WTTOT, and NOGDS 503.

VIII. CLASS AVERAGE

The class average subroutine is called by the main routine 100 when the CLASS AVERAGE key 50 is depressed. This subroutine displays the total number of students processed, the average numerical grade, and the average letter grade of those students. The number of students processed is stored in the variable NO-ST. The numerical grade average is calculated by dividing CL-PTS by NO-ST and the letter grade average is retrieved from the internal break point table.

IX. DISPLAY FORMATS

The calculator accommodates the following grading systems: raw score ("PTS"), 4 point ("4"), 5 point ("5"), 12 point ("12"), percent ("%"), and scaled grade percent ("G%"). The user selects the appropriate display format by repeatedly depressing the GRADE DISPLAY key 32 to cycle through the stated display formats. The current display format is identified by one of a series of annunciators present in the display window. Internally, the calculator processes grades based on a raw score. Therefore, unless raw score format has been selected, the grade must be converted prior to display.

The conversion between grading systems is achieved by the following algorithms:

Raw score to percent:

$$G.P.\% = \frac{RAW\ SCORE}{MAXIMUM\ POINTS}$$

Raw score to scaled percent:

$$G.P._{G\%} = \frac{[RAW\ SCORE - NEW\ SCALE\ MINIMUM]\ [100 - USER\ MINIMUM]}{[NEW\ MAXIMUM - NEW\ MINIMUM]} + USER\ MINIMUM$$

Raw score to 12 point:

$$G.P._{12} = \frac{[RAW\ SCORE - LOWER\ BREAK\ POINT] \times (3)}{[UPPER\ BREAK\ POINT - LOWER\ BREAK\ POINT]} + LOWER\ 12\ POINT\ BREAK\ POINT$$

12 point to 4 point:

$$G.P._4 = \frac{G.P._{12}}{3}$$

4 point to 5 point:

$$G.P._5 = G.P._4 + 1$$

In addition, the following foreign grading systems can be incorporated into the calculator based on the following algorithms:

12 point to 10 point (Japan):

$$G.P._{10} = G.P._{12} - 2$$

$$G.P._{10} = G.P._4 + 6$$

5 point to 1 point (Germany):

$$G.P._1 = 6 - G.P._5$$

X. OPERATION

The present calculator quickly and easily processes student grades in either numerical or letter format. The calculator is powered on by depressing the ON/CE/C key 22. The weight table is reset to default automatically, and the student and class counters are cleared.

As example 1, a maximum score of 100 and minimum score of 60 establish the break points listed above in Table 1. The entry of the following scores results in the following display:

TABLE 2

| | Number of Grades | % | G % | 4 | 5 | 12 | PTS | LTR |
|---|---|---|---|---|---|---|---|---|
| 86 | 1 | 86 | 86 | 3.10 | 4.10 | 9.3 | 86 | B |
| A | 2 | 95 | 95 | 4 | 5 | 12 | 95 | A |
| −25 | 3 | 75 | 75 | 2 | 3 | 6 | 75 | C |
| 74 | 4 | 74 | 74 | 2 | 3 | 6 | 74 | C |
| −39 | 5 | 61 | 61 | 0.6 | 1.6 | 1.8 | 61 | D− |
| B+ | 6 | 88.33 | 88.33 | 3.33 | 4.33 | 10 | 88.33 | B+ |
| Avg | 6 | 79.88 | 79.88 | 2.49 | 3.49 | 7.47 | 79.88 | C+ |

All grades are converted to numeric form before processing. Once processed, the numeric scores are converted to the desired display format.

As example 2, a test having a maximum score of 65 and a minimum acceptable score of 25 results in the following break points and illustrates the scaling up of the grade from true % (A− =87.18%) to grade % (A− =91.67 G %) due to the fact that minimum points is below 60% (the default scale minimum %):

TABLE 3

| Letter Grade | Break Point |
|---|---|
| A+ | 61.6 |
| A | 58.3 |
| A− | 55.0 |
| B+ | 51.6 |
| B | 48.3 |
| B− | 45.0 |
| C+ | 41.6 |
| C | 38.3 |
| C− | 35.0 |
| D+ | 31.6 |
| D | 28.3 |
| D− | 25.0 |

And, accordingly, the entry of the following individual scores yields the following display:

TABLE 4

| | | % | G % | 4 | 5 | 12 | PTS | Letter |
|---|---|---|---|---|---|---|---|---|
| A− | 1 | 87.18 | 91.67 | 3.67 | 4.67 | 11 | 56.67 | A− |
| −12 | 2 | 81.53 | 88.00 | 3.30 | 4.30 | 9.90 | 53.00 | B+ |
| 39 | 3 | 60.00 | 74.00 | 1.90 | 2.90 | 5.70 | 39.00 | C |
| No Grade | 4 | | | | | | | |
| C+ | 5 | 66.66 | 78.33 | 2.33 | 3.33 | 7.00 | 43.33 | C+ |
| Avg | 5 | 73.84 | 83.00 | 2.80 | 3.80 | 8.40 | 48.00 | B− |

In example 3, the user has offered 4 tests, each of varying weight:

TABLE 5

| Quiz 1 | 1 |
|---|---|
| Midterm | 2 |
| Quiz 2 | 1 |
| Final | 4 |

To automatically process the grades based upon the above-listed weights, the user depresses the SET key 24 and WT key 70 in succession. Next, each weight is individually entered, followed by depression of the SET key 24. Once the weights are entered, the calculator automatically weights the corresponding grades. The following table demonstrates the processing of weighted grades based on maximum points=100 and minimum points =60.

TABLE 6

| | (MAX PTS = 100 and MIN PTS = 60) | | | | | | |
|---|---|---|---|---|---|---|---|
| | Number of Grades | % | G % | 4 | 5 | 12 | PTS | LTR |
| B+ | 1 | 88.33 | 88.33 | 3.33 | 4.33 | 10.00 | 88.33 | B+ |
| C− | 2 | 71.67 | 71.67 | 1.67 | 2.67 | 5.00 | 71.67 | C− |
| −15 | 3 | 85.00 | 85.00 | 3.00 | 4.00 | 9.00 | 85 00 | B |
| 98 | 4 | 98.00 | 98.00 | 4.30 | 5.30 | 12.90 | 98.00 | A+ |
| Avg | 4 | 88.58 | 88.58 | 3.36 | 4.36 | 10.08 | 88.58 | B+ |

Table 7 demonstrates the use of the NO GRADE key 68 in conjunction with the internal weight table described in Table 5.

Once again, Maximum points=100 and minimum points=60:

TABLE 7

| | (MAX PTS = 100 and MIN PTS = 60) | | | | | | |
|---|---|---|---|---|---|---|---|
| | Number of Grades | % | G % | 4 | 5 | 12 | PTS | LTR |
| B+ | 1 | 88.33 | 88.33 | 3.33 | 4.33 | 10.00 | 88.33 | B+ |
| No | 2 | | | | | | | |

TABLE 7-continued

| (MAX PTS = 100 and MIN PTS = 60) | | | | | | | |
|---|---|---|---|---|---|---|---|
| Number of Grades | % | G % | 4 | 5 | 12 | PTS | LTR |
| Grade | | | | | | | |
| −15   3 | 85.00 | 85.00 | 3.00 | 4.00 | 9.00 | 85.00 | B |
| 98     4 | 98.00 | 98.00 | 4.30 | 5.30 | 12.90 | 98.00 | A+ |
| Avg    4 | 94.22 | 94.22 | 3.92 | 4.92 | 11.77 | 94.22 | A |

As example 4, a negative grading model is demonstrated. A 5-page test has been graded by determining the points off per page. To automatically compute the total points off and process this score, the user simply depresses the minus (−) key 62 followed by the points off for each page. After entry of the final page's points off, the ENTER NUMBER GRADE key 34 is depressed to process the test score. The following table demonstrates points off grading and its appropriate displays. The maximum points=100 and minimum points=60:

TABLE 8

| (MAX PTS = 100 and MIN PTS = 60) | | | | | | | | | | |
|---|---|---|---|---|---|---|---|---|---|---|
| Points off | | | | | | Total | % | G % | 4 | 6 | 12 | PTS | LTR |
| −3, | −2, | −5, | −1, | −0 | 1 | −11 | 89 | 89 | 3.4 | 4.4 | 10.2 | 89 | B+ |
| −7, | −6, | −5, | −8, | −1 | 2 | −27 | 73 | 73 | 1.8 | 2.8 | 5.4 | 73 | C− |
| −1, | −0, | −0, | −2, | −1 | 3 | −4 | 96 | 96 | 4.10 | 5.10 | 12.30 | 96 | A |
| −9, | −13, | −4, | −8, | −4 | 4 | −38 | 62 | 62 | 0.7 | 1.7 | 2.10 | 62 | D− |

XI. CONCLUSION

The above description is that of a preferred embodiment of the invention. Various changes and alterations can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A grade-averaging calculator for use by teachers in averaging a sequence of intermixed letter grades and numeric grades, said calculator comprising:
   letter means for inputting letter grades;
   numeric means for inputting numeric grades;
   conversion means for converting either rall of the inputted letter grades or all of the inputted numeric grades into a format enabling the numeric grades and the letter grades to be commonly processed; and
   processor means for calculating an average of a sequence of inputted and converted letter and numeric grades.

2. A calculator as defined in claim 1 further comprising storage means for storing weights to be associated with each ordinal position of the grades in the inputted sequence, said processor means being responsive to said storage means to accord each grade in each ordinal position the associated weight in calculating the average.

3. A calculator as defined in claim 1 further comprising excused absence means for inputting an excused absence, said processor means being responsive to said excused absence means for calculating the average only as a function of the inputted letter grades and numeric grades.

4. A grade-averaging calculator for use by teachers in averaging a sequence of mixed letter grades and numeric grades, said calculator comprising:
   letter means for inputting letter grades;
   numeric means for inputting numeric grades;
   processor means for calculating an average of the sequence of mixed letter grades and numeric grades inputted through said letter means and said numeric means, said processor means including converter means for converting at least either all of the letter grades or all of the numeric grades as necessary to a common format for averaging.

5. A calculator as defined in claim 4 wherein said converter means converts the letter grades to numeric grades.

6. A calculator as defined in claim 4 further comprising storage means for storing a plurality of weights each associated with an ordinal position in the entered sequence of grades, said processor means being responsive to said storage means for according each grade in the sequence the weight associated with the original position of the grade in the entered sequence.

7. A calculator as defined in claim 4 further comprising an excused absence means for inputting an excused absence, said processing means being responsive to said excused absence means for calculating the average only as a function of the letter grades and the numeric grades.

8. A grade-averaging calculator for averaging a sequence of grades wherein at least one is an excused absence, said calculator comprising:
   grade input means for inputting grades;
   excused input means for inputting an excused absence; and
   or means for calculating an average grade based only on the inputted grades, said calculator means being responsive to said grade input means and said excused input means so that the calculated average is a function of only the inputted grades without the excused absence affecting the average.

9. A calculator as defined in claim 8 further comprising storage means for storing a plurality of weights each to be associated with one of the ordinal positions in the grade sequence, said calculator means being responsive to said storage means so that each grade in the sequence is accorded the weight associated with the ordinal position of the grade in calculating the average.

10. A grade-averaging calculator permitting the accommodation of an excused absence, said calculator comprising:
    grade input means for inputting grades;
    excused absence input means for inputting excused absences; and
    calculator means responsive to said grade input means and said excused absence input means for calculating an average of the inputted grades as a function of the weighted inputted grades only and without any excused absence affecting the average 11. A calculator as defined in claim 11 further comprising storage means for storing a plurality of weights associated with the ordinal position in the sequence, said calculator means being responsive to said storage means to accord each grade the weight associated with the grade's ordinal position in the sequence.

12. A grade-averaging calculator for use by teachers in averaging a sequence of grades, said calculator comprising:

storage means for storing values indicative of the weight to be accorded each ordinal position in calculating the average of the sequence of grades;

grade input means for inputting a sequence of grades; and processor means for calculating an average of the inputted sequence of grades as a function of each grade and the weight in the storage means associated with the ordinal position of each grade, whereby grade information can be entered without the associated ordinal position weight.

13. A calculator as defined in claim 12 wherein said grade input means includes means for inputting letter grades and means for inputting numeric grades, and further wherein said processor means includes converter means for converting either all of the letter grades or all of the numeric grades to a format permitting the letter grades and the numeric grades to be commonly processed.

14. A calculator as defined in claim 12 further comprising excused absence means for entering an excused absence, said calculator means being responsive to said excused absence means so that the average is a function of only the inputted grades and not of the excused absences.

* * * * *

UNITED STATES PATENT AND TRADEMARK OFFICE
CERTIFICATE OF CORRECTION

PATENT NO. : 5,233,552
DATED : August 3, 1993
INVENTOR(S) : John L. Brittan

It is certified that error appears in the above-indentified patent and that said Letters Patent is hereby corrected as shown below:

Column 9, claim 1, line 48, "rall" should be --all--.
Column 10, claim 7, line 35, "processing" should be --processor--.
Column 10, claim 8, line 45, "or" should be --calculator--.
Column 11, line 1, "claim 11" should read -- claim 10--.

Signed and Sealed this

Fifth Day of April, 1994

Attest:

BRUCE LEHMAN

Attesting Officer        Commissioner of Patents and Trademarks